Oct. 12, 1926.

H. GAGNÉ

1,602,406

CORK AND STOPPER PULLER

Filed June 27, 1924

INVENTOR
Honorius Gagné.
BY
ATTORNEY

Patented Oct. 12, 1926.

1,602,406

UNITED STATES PATENT OFFICE.

HONORIUS GAGNÉ, OF MANCHESTER, NEW HAMPSHIRE.

CORK AND STOPPER PULLER.

Application filed June 27, 1924. Serial No. 722,691.

This invention relates to a cork extractor, or stopper puller which is designed for use instead of corkscrews, or which may be used in pulling the stopper from milk bottles, the invention having for an object the provision of a novel and simple device of this sort.

For further comprehension of the invention, and of the objects and advantages thereof, reference will be had to the following description and accompanying drawing, and to the appended claims in which the various novel features of the invention are more particularly set forth.

Figure 1:
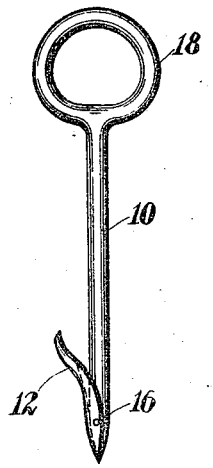

Fig. 1 of the drawing is a side view showing one form of my improved cork extractor.

Figure 2:
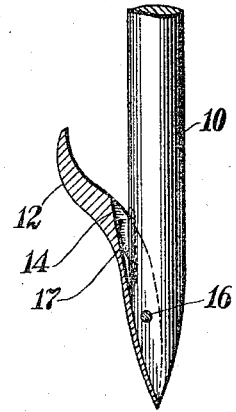

Fig. 2 is a fragmentary view partly in section and partly in longitudinal elevation.

In the form of the invention here shown the extractor comprises a straight shank 10 which may be of circular cross section, and which is of a size to enable it to be readily pressed through the stopper or cork. Secured to the front end of this shank, that is the end which is designed to pierce the stopper, is back-turned prong 12 which projects laterally from the shank, between its ends and has a pointed rear end extending in a general direction parallel to the shank. This prong is hollowed out in its main length as at 14 to partially straddle the shank, both the prong and the shank being pointed at their lower ends. The prong is pivoted to the shank a short distance above its lower end as at 16 and is normally retained in the position with its pointed lower end closely engaged with the point of the shank by a spring 17. The shank 10 is provided with a handle 18 at its rear end. When the point of the device is being inserted through the cork or stopper the pressure developed keeps the points of the prong and shank together. Upon further movement of the device through the cork or stopper, the pressure tends to move the rear end of the prong toward the shank permitting it to more readily be pressed through the stopper. When the prong has completely passed through the stopper the spring 17 throws it laterally to operative position to engage the stopper when the handle 18 is pulled.

Having thus described my invention, what I claim as new and desire to protect by Letters Patent of the United States is as follows:—

1. A device of the class described, comprising a shank provided with a pointed forward end joining the straight sides by a smooth curve, a prong pivoted between its ends to said curved portion of the shank, and having its forward end pointed being normally substantially flush with the pointed forward end of said shank, and its rear end normally offset laterally from said shank, and a normal positioning spring bearing against the rear portion of said prong, whereupon in the first stages of the device entering a stopper the pointed portions of shank and prong are flush, thereafter action against the stopper forces the rear end of the prong to substantially reduce said lateral offset, and finally when the rear end has cleared bottom of the stopper the action of the normal positioning spring forces the prong to normal position.

2. A device of the class described, comprising a shank provided with a pointed forward end joining the straight sides by a smooth curve, a prong pivoted between its ends to said curved portion of the shank, and having its forward end pointed and concaved being normally substantially flush with the pointed forward end of said shank, and its rear end normally offset laterally from said shank, and a normal positioning spring bearing against the rear portion of said prong, whereupon in the first stages of the device entering a stopper the pointed portions of shank and prong are flush, thereafter action against the stopper forces the rear end of the prong to substantially reduce said lateral offset, and finally when the rear end has cleared bottom of the stopper the action of the normal positioning spring forces the prong to normal position.

3. A device of the class described, comprising a shank provided with a pointed forward end joining the straight sides by a smooth curve, a prong pivoted between its ends to said curved portion of the shank, and having its forward end pointed and concaved being normally substantially flush with the pointed forward end of said shank and straddling same, and its rear end normally offset laterally from said shank, and a normal positioning spring bearing against the rear portion of said prong, whereupon in the first stages of the device entering a stopper the pointed portions of shank and prong are flush, thereafter action against the stopper forces the rear end of the prong to substantially reduce said lateral offset, and finally when the rear end has cleared the bottom of the stopper the action of the normal positioning spring forces the prong to normal position.

4. A device of the class described, comprising a shank adapted for gripping and provided with a pointed forward end joining the straight sides by a smooth curve, a prong pivoted between its ends to said curved portion of the shank, and having its forward end pointed and concaved being normally substantially flush with the pointed forward end of said shank and straddling same, and its rear end normally offset laterally from said shank, and a normal positioning spring bearing against the rear portion of said prong, whereupon in the first stages of the device entering a stopper the pointed portions of the shank and the prong are flush, thereafter action against the stopper forces the rear end of the prong to substantially reduce said lateral offset, and finally when the rear end has cleared the bottom of the stopper the action of normal positioning the spring forces the prong to normal position.

In testimony whereof I have affixed my signature.

HONORIUS GAGNÉ.